United States Patent [19]

Romanek

[11] 4,446,189

[45] May 1, 1984

[54] TEXTURED NONWOVEN TEXTILE FABRIC LAMINATE AND PROCESS OF MAKING SAID

[75] Inventor: Gerald A. Romanek, Greenville, S.C.

[73] Assignee: Phillips Petroleum Company, Bartlesville, Okla.

[21] Appl. No.: 493,832

[22] Filed: May 12, 1983

[51] Int. Cl.$^3$ .................... B32B 3/00; B32B 5/06; B32B 5/26

[52] U.S. Cl. ........................ 428/152; 2/270; 28/107; 28/112; 156/148; 156/176; 156/183; 156/199; 156/221; 156/229; 428/195; 428/198; 428/286; 428/288; 428/296; 428/300; 428/301

[58] Field of Search ............... 28/107, 112; 156/148, 156/176, 183, 199, 221, 229; 428/152, 195, 198, 286, 288, 296, 300, 301; 2/270

[56] References Cited

U.S. PATENT DOCUMENTS

| | | | |
|---|---|---|---|
| 286,037 | 10/1983 | Moyall | 428/152 |
| 2,030,746 | 2/1936 | Gallligan | 428/152 |
| 2,081,308 | 5/1937 | Rowe | 428/153 |
| 2,401,830 | 6/1946 | Kahil | 428/152 |
| 2,619,648 | 12/1952 | Hardie | 2/270 |
| 2,905,581 | 9/1959 | Maxey | 428/198 |
| 3,154,462 | 10/1964 | Smith . | |
| 3,243,861 | 4/1966 | Kumin et al. . | |
| 3,483,601 | 12/1969 | Smith . | |
| 3,528,147 | 9/1970 | Fior et al. . | |
| 3,534,852 | 10/1970 | Posner | 206/13 |
| 3,639,917 | 2/1972 | Althouse | 2/270 |
| 3,692,603 | 9/1972 | Rhodes | 428/152 |
| 3,694,815 | 10/1972 | Burger | 2/270 |
| 3,728,203 | 4/1973 | Taylor | 428/152 |
| 3,755,062 | 8/1973 | Schirmer . | |
| 3,842,832 | 10/1974 | Wideman | 128/169 |
| 3,950,587 | 4/1976 | Colijn et al. | 428/234 |
| 3,994,759 | 11/1976 | Stoller | 156/85 |
| 4,042,655 | 8/1977 | Platt et al. | 264/25 |
| 4,197,343 | 4/1980 | Forsythe | 428/195 |

*Primary Examiner*—James C. Cannon

[57] ABSTRACT

A nonwoven textile fabric laminate comprising at least one layer of nonwoven textile fabric secured by needle punching to an elastic layer such that the nonwoven fabric layer is permanently stretched when the elastic layer is drafted to a condition within its elastic limit and the nonwoven fabric layer exhibits increased bulk when the elastic layer is allowed to relax and return to substantially its condition prior to drafting. One form of the fabric laminate includes a nonwoven textile fabric layer needle punched to each side of the elastic layer. Various methods and apparatus for producing such laminates are also disclosed.

28 Claims, 14 Drawing Figures

TEXTURED NONWOVEN TEXTILE FABRIC LAMINATE AND PROCESS OF MAKING SAID

The invention relates generally to textile fabrics. In one aspect, the invention relates to novel nonwoven textile fabric articles of manufacture. In another aspect, the invention relates to novel methods of producing nonwoven textile fabric articles of manufacture.

It is often desirable to produce textile products having high bulk for uses such as thermal insulation and both decorative and functional cushioning. It is also often desirable to produce high bulk textile products having elasticity or resiliency for use in such applications as wearing apparel to allow enhanced freedom of movement for the wearer of such apparel.

The present invention provides novel textile articles of manufacture and methods of producing such articles which provide both high bulk and high elasticity.

It is an object of the present invention to provide a novel nonwoven fabric product.

Another object of the present invention is to provide a method of producing a novel nonwoven fabric product.

Yet another object of the present invention is to provide nonwoven fabric products having high bulk.

Still another object of the present invention is to provide nonwoven fabric products having high elasticity.

A further object of the present invention is to provide an article of manufacture having exceptional thermal insulation characteristics.

Another object of the present invention is to provide novel nonwoven fabric-elastic composite laminates and methods for their production which are simple, efficient and economical.

The present invention contemplates a laminated article of manufacture. The laminated article of manufacture comprises an inner layer of generally elastic material of inherent resilience having opposite sides. The generally elastic material is capable of being drafted in response to a drafting force from a first relaxed condition defined by a first set of dimensions to a second set of drafting condition defined by a second set of dimensions within the elastic limit of the generally elastic material. The generally elastic material is further capable of retracting from the second condition to substantially the first position in response to its inherent resilience upon release of the drafting force. The laminated article of manufacture further includes a first outer layer comprising a first generally inelastic nonwoven textile fabric comprising a plurality of generally coherent nonwoven fibers and superposed on one of the opposite sides of the inner layer of generally elastic material. The first outer layer is capable of being drafted in response to a drafting force from a first relaxed condition defined by a first set of dimensions to a second drafted condition defined by a second set of dimensions beyond the elastic limit of the first generally inelastic nonwoven textile fabric. The first outer layer is further incapable of self-induced retraction from the second condition to the first condition upon release of the drafting force. The layers of the laminated article of manufacture are secured together at a plurality of locations spaced a distance one from the other by means of a plurality of the fibers of the nonwoven fabrics extending from the first outer layer through the inner layer of generally elastic material at at least one penetration point at each of the locations when the inner and outer layers are in their second conditions, whereby the first outer layer exhibits increased bulk intermediate the plurality of locations when the inner layer retracts from its second condition to substantially its first position.

The present invention further contemplates a method of producing a laminated article of manufacture. This method includes positioning in superposed relation a nonwoven textile fabric layer and a layer of generally elastic material having inherent resilience to form superposed layers. The superposed layers are needle punched to secure ihe fabric layer to the layer of generally elastic material at a plurality of needle punched locations each spaced a predetermined distance from the next adjacent needle punched location to secure the fabric layer to the layer of generally elastic material at the needle punched locations and thereby form needle punched superposed layers. The superposed layers are drafted in at least one direction an amount wthin the elastic limit of the layer of generally elastic material to thereby permanently stretch the nonwoven textile fabric layer. The needle punched and drafted superposed layers are thereafter allowed to relax, thereby permitting the layer of generally elastic material to substantially return to its original dimensions in response to its inherent resilience whereby the bulk of the stretched nonwoven textile fabric layer is increased between the needle punched locations.

Other aspects, objects, features and advantages of the present invention will become apparent to those skilled in the art on reference to the instant specification, appended claims and accompanying drawing in which:

Figure 1:
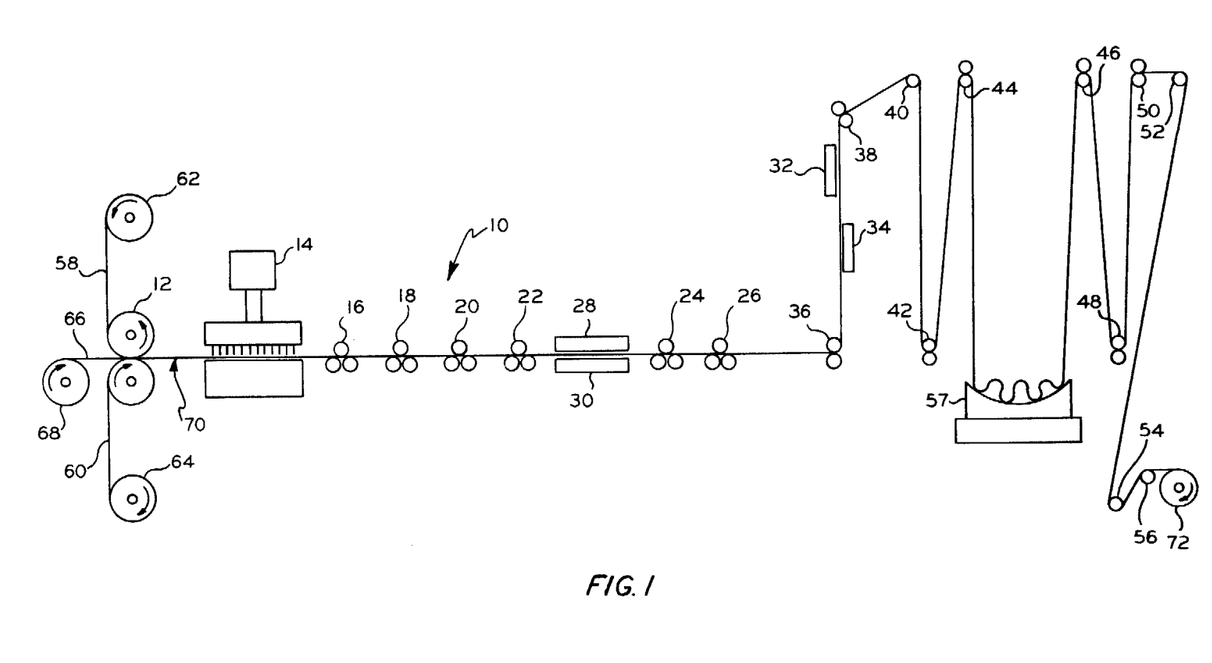
FIG. 1 is a schematic diagram of one form of apparatus in accordance with the present invention.

Referring now to the drawings, and FIG. 1 in particular, apparatus generally designated by the reference character 10 is schematically depicted therein, such apparatus 10 being adapted for the production of a laminated article of manufacture in accordance with the present invention. The apparatus 10 comprises a set of feed nip rolls 12, a needle loom 14, six sets of nip rolls 16, 18, 20, 22, 24 and 26, heaters 28, 30, 32 and 34, rolls 36, 38, 40, 42, 44, 46, 48, 50, 52, 54 and 56, and a suitable surge zone in the form of a "J" box 57.

In operation, the apparatus 10 is provided with layers of suitable nonwoven textile fabric 58 and 60 provided in the form of continuous webs from respective supply rolls 62 and 64. Nonwoven textile fabric webs suitable for use as the layers 58 and 60 can be produced by the method and apparatus disclosed in U.S. Pat. No. 4,042,655 issued to Platt et al., the disclosure of which is incorporated herein by reference. Particularly good results are obtained by employing layers 58 and 60 comprising polyethylene terephthalate fibers of about 3 denier and about 3½ inches in length, the fibers having been needle punched at a punch density of from about 100 to about 400 punches per square inch with about 0.5 inch needle penetration to provide a more coherent nonwoven fabric structure. Each of these layers 58 and 60 weighs about 2.3 ounces per square yard and is unfused.

A layer of generally elastic material 66 in the form of a continuous web is provided to the apparatus 10 from a supply roll 68. Particularly good results are obtained by employing a layer 66 of polyurethane foam having a thickness of about 0.025 inches.

The layers 58, 60 and 66 are fed in superposed relation through the feed nip rolls 12 with the layers 58 and 60 disposed on opposite sides of the layer 66 forming a composite or laminate 70 in partially completed form for further processing by the apparatus 10. The thus assembled partially completed laminate is fed by the feed nip rolls 12 through the needle loom 14 at a suitable linear speed of, for example, about 8½ feet per minute and further through the nip rolls 16–26. The needle loom 14 functions to needle punch the superposed layers 58, 60 and 66 of the laminate 70 at a plurality of needle punched locations each spaced a predetermined distance from the next adjacent needle punched location to secure the nonwoven textile fabric layers 58 and 60 to the generally elastic material layer 66 at the needle punched locations to thereby form needle punched superposed layers. A suitable needle loom 14 for producing a laminate 70 is provided with 46 needles per inch across the superposed layers in 23 rows about 0.5 inch apart in the direction of movement of the laminate.

The needle punched superposed layers are then drafted in the machine direction or direction of movement of the laminate 70 through the apparatus 10 by means of the nip rolls 16, 18, 20 and 22. It will be understood that when using nip rolls to perform this drafting step, only two sets of nip rolls are actually required to draft the needle punched laminate. However, the use of more than two sets of nip rolls such as the four sets of nip rolls 16, 18, 20 and 22 provides more uniform drafting since between any set of nip rolls a smaller drafting ratio can be used and still obtain the overall desired drafting ratio. In the apparatus 10 it is presently preferred that the feed rate of the nip rolls 12 and the nip rolls 16 be substantially identical so that substantially no drafting of the laminate 70 is applied through the needle loom 14. Generally from about 2 to about 6 sets of nip rolls can be utilized to achieve the desired drafting of the laminate. The draft ratio applied to the laminate is limited by the elastic limit of the generally elastic material layer 66 as well as the capability of the nonwoven textile fabric layers 58 and 60 to be drafted while maintaining a desirable amount of structural integrity. The draft ratio is also selected to provide the desired amount of bulking of the nonwoven textile fabric layers 58 and 60 in the completed laminate product. In general an overall draft ratio ranging from about 1.01:1 to about 4:1, with good results being obtained with an overall draft ratio generally in the range from about 1.5:1 to about 2:1. The feed rates of the nip rolls 22, 24 and 26 are substantially equal thereby maintaining the laminate 70 in its fully drafted condition between the heaters 28 and 30. Between the nip rolls 26 and the rolls 36, the drafted laminate 70 is allowed to substantially return to its original dimensions in response to the inherent resilience of the generally elastic material layer 66. The thus relaxed laminate 70 is then fed from the rolls 36 between the heaters 32 and 34 to rolls 38 and thereafter via rolls 40, 42, 44, 46, 48, 50, 52, 54 and 56 as well as the "J" box 57 to a suitable takeup zone where the completed laminate is taken up by suitable apparatus 72, such as a mandrel.

If desired, the laminate 70 can be fused using infrared radiation either while the laminate 70 is subjected to tension between the rolls 22 and 24 or when the laminate 70 is in its relaxed condition the rolls 36 and 38. Should it be desired, infrared radiation can be applied to the laminate 70 both when under tension or when relaxed. Heaters 28, 30, 32 and 34 can provide the desired infrared radiation individually or in combinations of any two or more of the heaters. The selection of the heaters to be employed depends upon the degree of fusion of the filaments of the nonwoven textile fabric layers desired. It should be clearly understood that the laminated article of manufacture of the present invention is not to be limited to a fused product, and a highly useful, and presently preferred, article of manufacture can be produced by the process and apparatus of the present invention by not employing any of the infrared heaters or any other fusion means.

It will further be understood that a fused article of manufacture can be produced according to the present invention by employing various other fusion means, such as hot rolls, a hot fluid chamber and the like, so long as the inherent resilience of the generally elastic material layer 66 is not adversely affected. If a hot fluid chamber is used as the fusion means, the depth of fusion is very difficult to control, if not impossible, and the equipment needed to simultaneously subject the unfused nonwoven textile fabric layers to tension in the machine direction and the hot fluid would be complicated and relatively expensive. If hot rolls are used to fuse either or both of the nonwoven textile fabric layers 58 and 60, such layers subjected to such fusion will be primarily fused on the surface with little or no depth control, and the fibers on or near the surface would be flattened, thus destroying the cross section of the thus flattened fibers. The drafted laminate 70 can be fused in its drafted condition by means of one or more heated rolls at the nip rolls 24. The laminate 70 can be fused by heated rolls at 36 or 38 in its relaxed condition.

Figure 5:
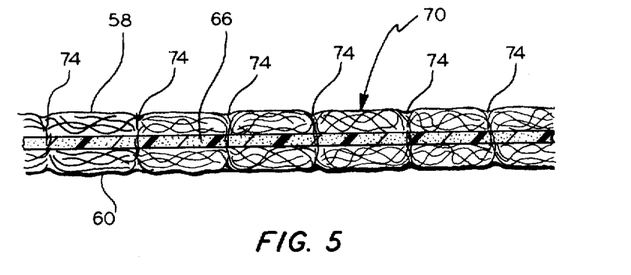
FIG. 5 is an enlarged cross section of a partially completed laminate in accordance with the present invention showing the needle punched superposed layers prior to drafting.
Figure 6:
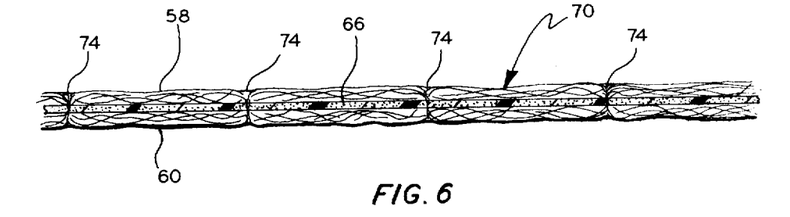
FIG. 6 is an enlarged cross section of the partially completed laminate of FIG. 5 showing the needle punched superposed layers in a drafted condition.
Figure 7:
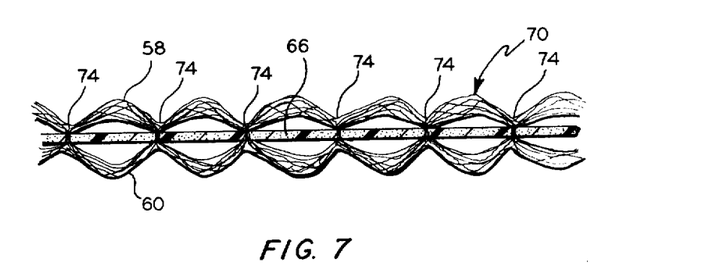
FIG. 7 is an enlarged cross section of the completed laminate of FIG. 5 in a relaxed condition after drafting.

FIGS. 5, 6 and 7 illustrate by enlarged cross-sectional views of the laminate 70 taken along lines parallel to the line of movement of the laminate to the apparatus 10 the various configurations of the laminate as it moves through the apparatus 10. FIG. 5 illustrates the condition of the laminate 70 as it moves between the needle loom 14 and the nip rolls 16 prior to being subjected to drafting in the machine direction. The layers 58 and 60 are shown secured to the generally elastic material layers 66 by means of a plurality of needle punched fibers or filaments extending from the layers 58 and 60 extending from the outer layers 58 and 60 through the inner elastic layer 66 at a plurality of locations 74 spaced a distance one from the other. FIG. 6 illustrates the same segment of the laminate 70 in its fully drafted condition as it passes from nip rolls 22 to nip rolls 24. It will be noted that the laminate 70 is shown in FIG. 6 after being subjected to a draft ratio of about 2:1 whereby the spacing dimensions between ajdacent locations 74 are approximately twice the spacing dimensions between adjacent locations 74 in FIG. 5. It will also be noted that in FIG. 6 the outer nonwoven textile fabric layers 58 and 60 have been permanently stretched in the machine direction while the inner elastic material layer 66 has been stretched an amount within the elastic limit of the elastic material forming the layer 66. FIG. 7 illustrates the laminate 70 again in its relaxed condition subsequent to the drafting as the laminate 70 moves from roll 36 toward ultimate takeup in the takeup zone. The laminate 70 exhibits increased bulk in the outer textile fabric layers 58 and 60 between the needle punched locations 74 in response to the retraction of the inner elastic material layer 66 from its drawn condition to substantially its first position prior to being subjected to drafting.

Figure 2:
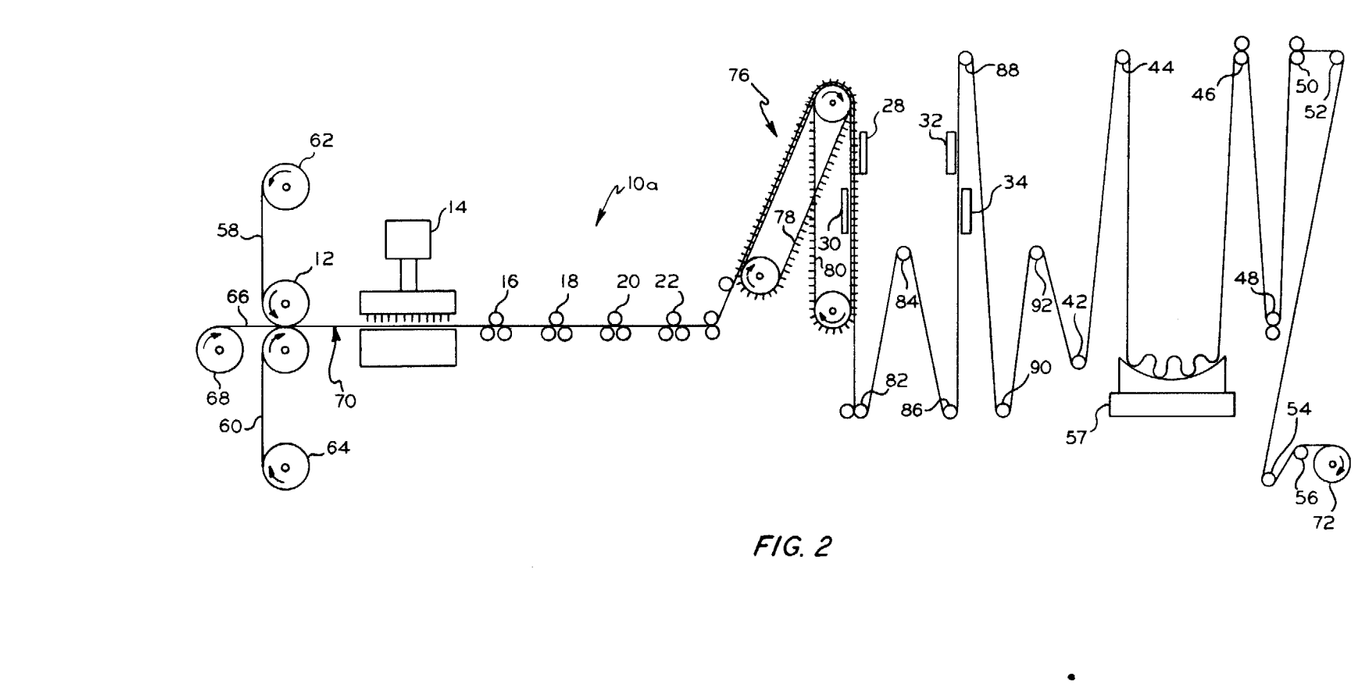
FIG. 2 is a schematic diagram of another form of apparatus in accordance with the present invention.

FIG. 2 illustrates another form of apparatus for performing the process of the present invention which differs somewhat from the apparatus 10 and which is generally designated by the reference character 10a. Those elements of the apparatus 10a which are identical to those previously described for the apparatus 10 bear the same reference characters. The apparatus 10a differs from the apparatus 10 in the provision of additional apparatus for drafting the laminate 70 in a direction transverse to the direction of movement of the laminate 70 through the apparatus 10a. Suitable apparatus for this purpose includes a tenter frame 76 which comprises a transverse drafting section 78 and a tensioning section 80. The tensioning section 80 is not used to draft the laminate 70, but is rather utilized to subject the laminate 70 to tension in the transverse direction. While the laminate 70 is being subjected to tension by the tensioning section 80, the laminate 70 can be subjected to infrared radiation by either or both of the infrared heaters 28 and 30 in the same manner as described above for the apparatus 10. The drafted laminate 70 is then permitted to relax as it moves from the tensioning section 80 to the takeup zone via previously described rolls 42–56 and additional rolls 82, 84, 86, 88, 90 and 92. It will also be noted that the thus relaxed laminate 70 can be subjected to fusion by either or both of the infrared heaters 32 and 34 in a manner as also described above for the apparatus 10.

It will be understood that the apparatus 10 permits the completed laminate to increase the bulk of the nonwoven textile fabric layers 58 and 60 by means of both longitudinal and transverse retraction of the inner elastic material layer 60 upon its relaxation subsequent to both longitudinal and traverse drafting.

Figure 3:
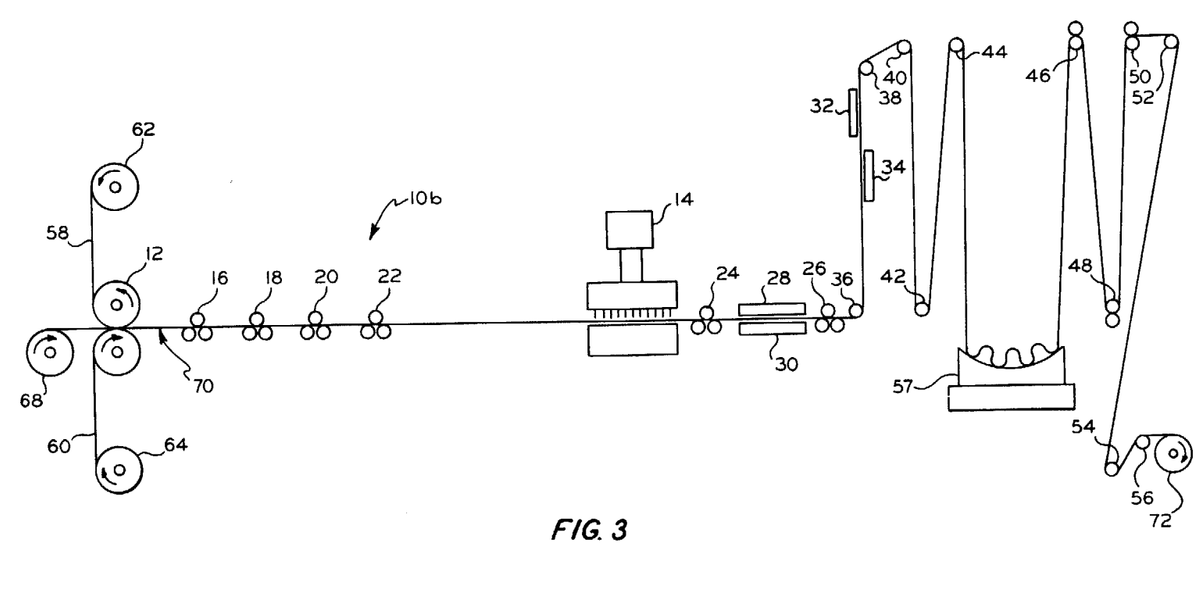
FIG. 3 is a schematic diagram of yet another form of apparatus in accordance with the present invention.

FIG. 3 illustrates yet another form of apparatus for performing the process of the present invention which is generally designated by the reference character 10b. The apparatus 10b differs from the previously described apparatus 10 in that the laminate 70 is subjected to longitudinal drafting in the machine direction prior to the movement of the thus drafted laminate 70 through the needle loom 14 where the laminate 70 is maintained in its thus drafted condition by means of nip rolls 22 and 24 which advance the laminate 70 through the needle loom 14 at substantially identical feed rates. The infrared heaters 28 and 30 are positioned between nip rolls 24 and 26 which also operate at the same feed rates whereby the outer nonwoven textile fabric layers 58 and 60 can be fused by infrared radiation by the heaters 28 and/or 30 while the laminate 70 is in the drafting condition if desired. The laminate 70 is allowed to relax as the laminate moves from the nip rolls 26 and the infrared heaters 32 and/or 34 and provide suitable fusion of the fibers of the outer nonwoven textile fabric layers 58 and 60 while the laminate is in its relaxed condition if desired. As in the apparatus 10, any combination of one or more of the infrared heaters 28, 30, 32 and 34 can be employed if fusion of the nonwoven textile fabric layers is desired. It will be understood that the use of the infrared heaters in the apparatus 10b is optional. Those elements of the apparatus 10b which are identical to the previously described elements of the apparatus 10 are designated by the same reference characters.

Figure 4:
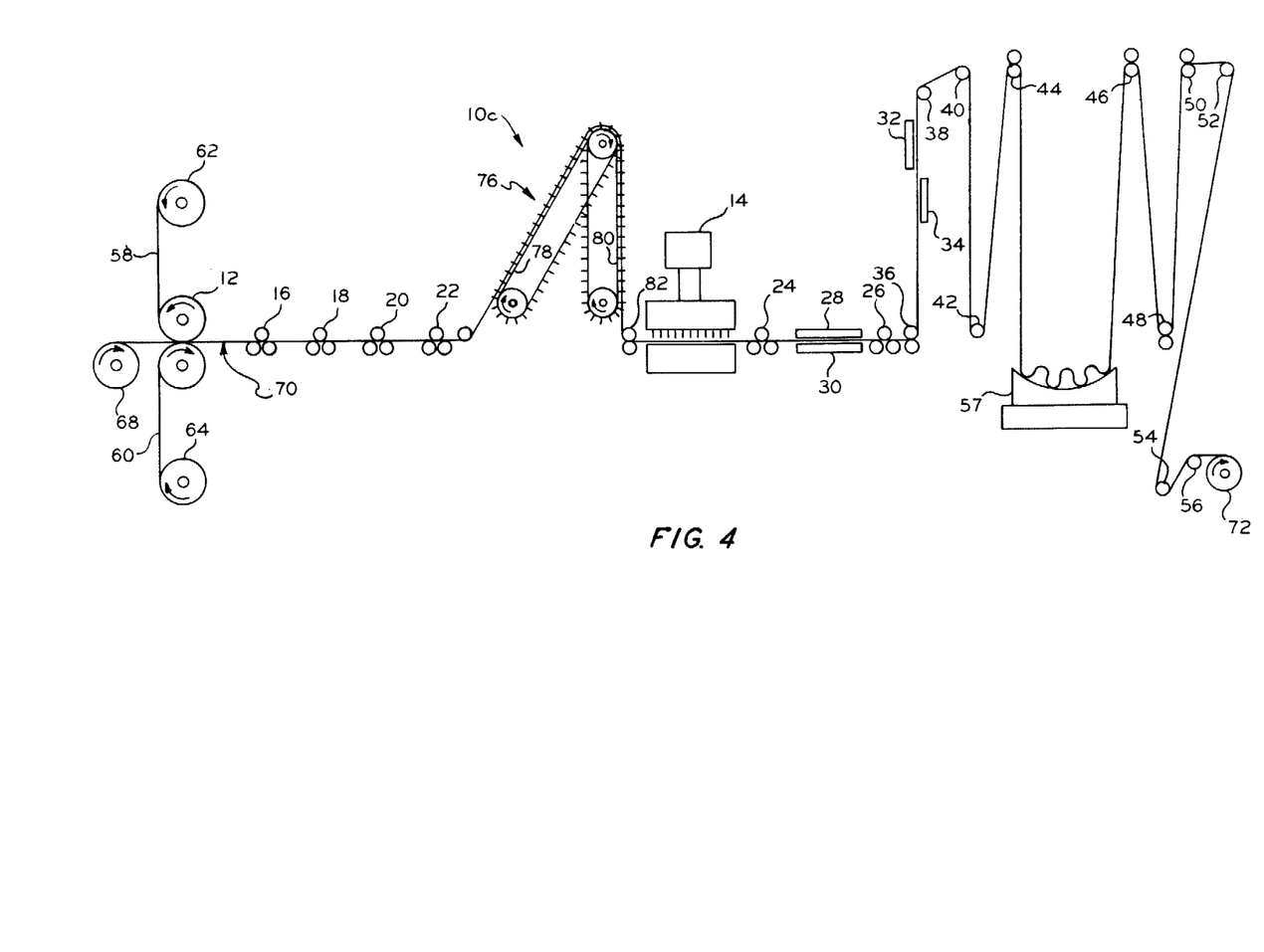
FIG. 4 is a schematic diagram of still another form of apparatus in accordance with the present invention.

FIG. 4 illustrates still another form of the apparatus of the present invention which will be generally designated by the reference character 10c. The apparatus 10c differs from the previously described apparatus 10b in that a tenter frame 76 is interposed in the line between the nip rolls 22 and the needle loom 14. Those elements of the apparatus 10c which are identical to the elements of apparatus 10b carry the same reference characters. The tenter frame 76 is identical to the tenter frame described for the apparatus 10a and comprises a transverse drafting section 78 and a tensioning section 80. It will be noted that the apparatus 10c provides for both drafting the laminate 70 in the longitudinal machine direction by means of the nip rolls 16, 18, 20 and 22 and further drafting the laminate 70 transversely of the machine direction by means of the tenter frame 76. The thus longitudinally and transversely drafted laminate 70 is passed through the needle loom 14 while being maintained in this drafted condition by means of the rolls 82 and 24 which operate at the same feed rate. Similarly rolls 24 and 26 operate at the same feed rate thus permitting the fusion of the outer nonwoven textile fabric layers 58 and 60 by means of the infrared heaters 28 and 30 while the laminate is in a fully drafted condition. The laminate 70 is allowed to relax in response to the inherent resilience of the generally elastic material inner layer 66 downstream of the rolls 26 thus allowing the fusion of the outer layers 58 and 60 by means of the infrared heaters 32 and 34 when the laminate 70 is in its relaxed condition. As in the previously described forms of apparatus of the present invention, the infrared heaters 28, 30, 32 and 34 can be employed in any combination desired or may be omitted from the process practiced on the apparatus 10c.

Figure 8:
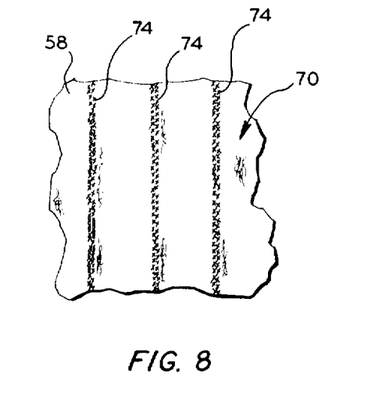
FIG. 8 is a plan view of a portion of a laminate in accordance with the present invention illustrating one pattern of needle punched locations.

FIG. 8 illustrates one form of laminate 70 wherein the layers 58, 60 and 66 are secured together at needle punched locations 74, which locations 74 comprise a plurality of needle penetration points aligned in parallel rows which are generally perpendicular to the machine direction or line of movement of the laminate 70 through the needle loom 14. When the laminate 70 is in its relaxed condition, the spacing between adjacent locations 74 can be any dimension which provides the desired degree of bulking of the outer layers 58 and 60. Generally each location 74 is spaced from the next location 74 a distance generally in the range from about one-fourth inch to about two inches, and more preferably in the range from about one-half inch to about one inch. A particularly advantageous laminate 70 can be produced when the laminate is subjected to a drafting ratio of about 2:1 and the relaxed spacing between adjacent locations 74 is about one-half inch.

Figure 9:
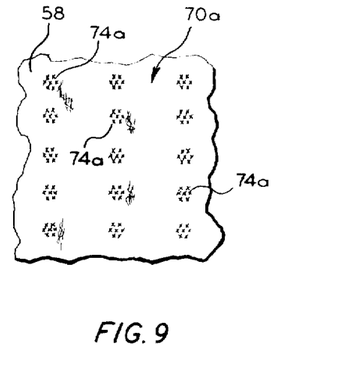
FIGS. 9, 10, 11, 12, 13 and 14 are plan views similar to FIG. 8 illustrating other patterns of needle punched locations.

FIG. 9 illustrates another form of laminate 70a in which the needle punched locations are designated by the reference character 74a, with each location 74a comprising a cluster of needle penetrations. The spacing between adjacent locations 74a can be any dimension which provides the desired degree of bulking of the outer layers 58 and 60. The spacing between adjacent locations 74a falls in the same range as recited above for the locations 74. The pattern of locations 74a on the laminate 70a is particularly advantageous when the laminate is subjected to drafting in both the longitudinal and transverse directions as by the apparatus illustrated in either FIG. 2 or FIG. 4.

Figure 10:
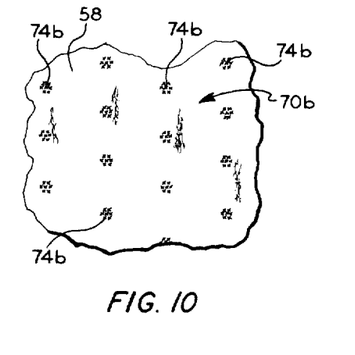

FIG. 10 illustrates still another needle pattern on a laminate 70b wherein the layers 58, 60 and 66 are secured together at locations 74b in the form of clusters of needle penetrations. The laminate 70b is substantially identical to the previously described laminate 70a with the notable exception that the locations 74b are transversely staggered relative to the next longitudinally adjacent location 74b.

Figure 11:
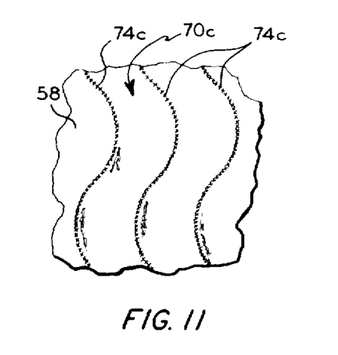

FIG. 11 illustrates still another form of laminate designated by the reference character 70c wherein the layers 58, 60 and 66 are secured together at locations 74c which are in the form of parallel rows of needle penetrations which are aligned generally perpendicular to the longitudinal line of movement of the laminate through the needle loom. It will be noted that the parallel rows of penetrations follow generally sinusoidal paths. The spacing between adjacent locations 74c when the laminate 70c is in its relaxed condition are the same as described above for the spacing between the locations 74 in the laminate 70 described above and illustrated in FIG. 8.

Figure 12:
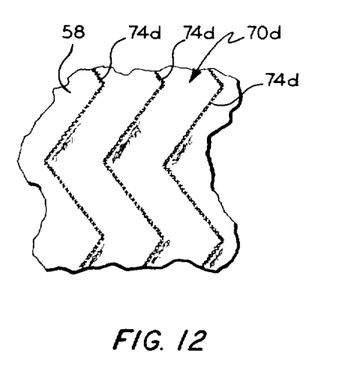

FIG. 12 illustrates still another form of laminate designated by the reference character 70d. The layers 58, 60 and 66 are secured together at locations 74d in the form of generally parallel rows of needle penetrations which rows are generally perpendicular to the longitudinal line of movement of the laminate through the loom and which rows follow a generally zigzag path creating a herringbone pattern in the laminate 70d. Again, the spacing between adjacent locations 74d when the laminate 70d is in the relaxed condition are as previously described for the location 74 of the laminate 70 illustrated in FIG. 8.

Figure 13:
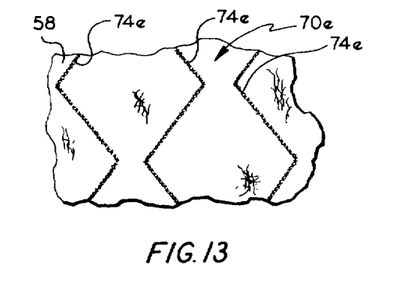

FIG. 13 illustrates a laminate form designated by the reference character 70e. The layers 58, 60 and 66 of the laminate 70e are secured together at locations 74e and are in the form of generally parallel rows of needle pentrations which follow zigzag paths, these paths being generally perpendicular to the line of direction of the laminate through the needle loom. It will be noted, however, that the zigzag path of each location 74e is transversely staggered relative to the zigzag path of the next adjacent location 74e thus providing alternating areas of greater and lesser bulk of the outer nonwoven textile fabric layers 58 and 60 when the laminate 70e is in its relaxed condition. In the laminate 70e, the minimum spacing between adjacent locations 74e can be any dimension which provides the desired degree of bulking, but generally the minimum spacing between adjacent locations 74e is in the range from about one-quarter to about two inches and more preferably in the range from about one-half to about one inch.

Figure 14:
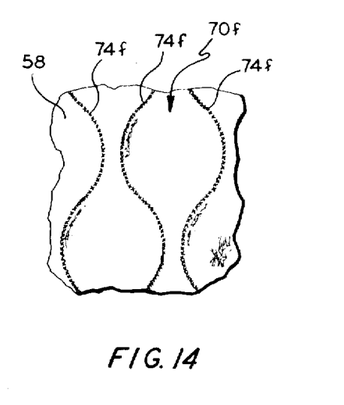

FIG. 14 illustrates yet another form of laminate produced in accordance with the present invention and designated by the reference character 70f. The layers 58, 60 and 66 are secured together at locations 74f, which locations are generally in the form of generally parallel rows of needle penetrations which are generally perpendicular to the longitudinal direction of movement of the laminate 70f through the needle loom. Each row of needle penetrations of a location 74f follows a generally sinusoidal path, with the generally sinusoidal path of each location 74f being tansversely staggered relative to the sinusoidal path of needle penetrations of the next adjacent location 74f. The spacings between adjacent locations 74f are identical to those described above for the location 74e in the laminate 70e.

The nonwoven textile fabric layers 58 and 60 can be of any suitable nonwoven material which can be subjected to drafting in the operations described above and thereby permanently stretched. Particularly advantageous nonwoven textile fabrics are those formed of any suitable cardable staple type fibers, either synthetic or natural. Suitable synthetic fibers include, but are not limited to, polyesters, poly(arylene sulfides), acrylics, polypropylene, and polyamides. Polyester nonwoven fabrics can be advantageously employed in the laminate of the present invention for thermal insulation such as in clothing. Poly(arylene sulfide) nonwoven fabrics, particularly poly(phenylene sulfide) nonwoven fabrics, can be advantageously employed where high temperatures will be encountered. Nonwoven fabrics of acrylic fibers can be advantageously employed where resistance to ultraviolet radiation is important. Nonwoven textile fabrics of polypropylene fibers can be advantageously employed where a thermal insulation and buoyancy in water is an objective. While any fabric weight can be employed which will achieve the desired characteristics of the resulting laminate, such fabrics generally fall in the range of from about 2 to about 4 ounces per square yard. In those nonwoven fabrics employing staple fibers, any staple length which will provide the desired results can be employed, however, suitable staple lengths generally fall in the range from about 2 to about 6 inches, and preferably in the range from about 3 to about 4 inches, with a staple length of about 3.25 inches providing very good results. The denier of the synthetic fibers employed in the nonwoven textile fabric layers 58 and 60 can also be any denier which will provide the desired results in the finished product, however, suitable deniers generally fall in the range from about 1 to about 200 and above, more preferably in the range from about 1.5 to about 15, and more preferably still in the range from about 3 to about 5.

The generally elastic material inner layer 66 can be of any suitable material having inherent resilience which can be drafted an amount within the elastic limit of the material and still regain substantially its original dimensions when allowed to relax. Such materials can include elastic knitted nonwoven fabrics or paper products, as well as elastomeric and rubber foam or solid sheet materials. As used herein, the term "elastic" in reference to a body or layer means a body or layer which, having had its size or shape changed by the application of a distorting force, returns or retracts to its original condition upon the removal of that force. More particularly, an "elastic layer" as referred to herein, means a layer which, having had its dimensions or length and/or width increased by the application of drafting forces thereto, returns to its original or substantial original dimensions upon the removal or relaxation of those drafting forces.

The generally elastic material layer 66 can be of any suitable weight which will provide the desired characteristics of the finished laminate product, but generally such materials generally fall in the range from about 2 to about 4 ounces per square yard. The thicknesses of the elastic material layer 66 can also be any suitable thickness which provides the desired characteristics of the finished laminate product, however, an inner layer of polyurethane foam having a thickness of about 0.025 inch has been shown to provide extremely satisfactory results.

While it has been mentioned that the product of the present invention can be advantageously employed as clothing insulation, high temperature insulation or as a flotation medium, it should be noted that products produced in accordance with the present invention can also be advantageously applied as filtration media or as sound absorbent elements. Generally, however, laminated nonwoven fabric articles of manufacture produced in accordance with the present invention can be employed advantageously where increased bulk and surface area are desirable attributes.

Changes can be made in the combination and arrangement of parts or elements of the article of manufacture and the apparatus employed in producing the article of manufacture as heretofore set forth in the specification and shown in the drawings without departing from the spirit and scope of the invention as defined in and limited only by the following claims.

That which is claimed is:

1. A method of producing a laminated article of manufacture comprising:
   (a) positioning in superposed relation a nonwoven textile fabric layer comprising a plurality of fibers and a layer of generally elastic material having inherent resilience to form superposed layers;
   (b) needle punching said superposed layers to secure said fabric layer to said layer of generally elastic material at a plurality of needle punched locations each spaced a predetermined distance from the next adjacent needle punched location to secure said fabric layer to said layer of generally elastic material at said needle punched locations and thereby form needle punched superposed layers;
   (c) drafting said superposed layers in at least one direction an amount within the elastic limit of said layer of generally elastic material to thereby permanently stretch said nonwoven textile fabric layer; and
   (d) thereafter allowing said thus needle punched and drafted superposed layers to relax, thereby permitting said layer of generally elastic material to substantially return to its original dimensions in response to its inherent resilience whereby the bulk of said stretched nonwoven textile fabric layer is increased between said needle punched locations.

2. A method in accordance with claim 1 wherein said plurality of needle punched locations are in the form of a plurality of substantially mutually parallel rows of needle penetrations in said superposed layers.

3. A method in accordance with claim 2 wherein each of said plurality of substantially mutually parallel rows is straight.

4. A method in accordance with claim 2 wherein each of said plurality of substantially mutually parallel rows follows a non-linear path.

5. A method in accordance with claim 2 wherein each of said plurality of substantially mutually parallel rows follows a generally sinusoidal path.

6. A method in accordance with claim 2 wherein said superposed layers are drafted in a direction generally perpendicular to said mutually parallel rows of needle penetrations in said superposed layers.

7. A method in accordance with claim 1 wherein each of said plurality of needle punched locations is in the form of a cluster of a plurality of mutually proximate needle penetrations in said superposed layers.

8. A method in accordance with claim 7 wherein said superposed layers are drafted in at least two directions.

9. A method in accordance with claim 7 wherein each of said clusters of mutually proximate needle penetrations is spaced a distance from the next adjacent cluster of mutually proximate needle penetrations a distance in the range from about ¼ inches to about 2 inches.

10. A method in accordance with claim 1 wherein each of said plurality of needle punched locations is spaced a distance from the next adjacent needle punched location in the range from about ¼ inch to about 2 inches.

11. A method in accordance with claim 1 wherein each of said plurality of needle punched locations is spaced a distance from the next adjacent needle punched location in the range from about ¼ inch to about 1 inch.

12. A method in accordance with claim 1 wherein each of said plurality of needle punched locations is spaced a distance from the next adjacent needle punched location in the range from about ½ inch to about 2 inches.

13. A method in accordance with claim 1 wherein step (c) immediately follows step (a) and immediately preceeds step (b), and step (d) immediately follows (b).

14. A method in accordance with claim 1 characterized further to include fusing at least a portion of said fibers of said nonwoven textile fabric layer subsequent to drafting said superposed layers and prior to allowing said thus drafted superposed layers to relax.

15. A method of producing a laminated article of manufacture comprising:
   (a) positioning in superposed relation a first nonwoven textile fabric layer on one side of a layer of generally elastic material having inherent resilience and a second nonwoven textile fabric layer on the opposite side of said layer of generally elastic material having inherent resilience to from superposed layers;
   (b) needle punching said superposed layers to secure said fabric layers to the respective opposite sides of said layer of generally elastic material at a plurality of needle punched locations each spaced a predetermined distance from the next adjacent needle punched location to secure said layers together at said needle punched locations;
   (c) drafting said superposed layers in at least one direction an amount within the elastic limit of said layer of generally elastic material to thereby permanently stretch said first and second nonwoven textile fabric layers; and
   (d) thereafter allowing said needle punched and drafted superposed layers to relax to permit said layer of generally elastic material to substantially return to its original dimensions previous to said drafting step in response to its inherent resilience whereby the bulk of each of said permanently stretched first and second nonwoven textile fabric layers is increased between said needle punched locations.

16. A method in accordance with claim 15 wherein said plurality of needle punched locations are in the form of a plurality of substantially mutually parallel rows of needle penetrations in said superposed layers.

17. A method in accordance with claim 16 wherein said superposed layers are drafted in a direction generally perpendicular to said mutually parallel rows of needle penetrations in said superposed layers.

18. A method in accordance with claim 15 wherein each of said plurality of needle punched locations is in the form of a plurality of clusters of mutually proximate needle penetrations in said superposed layers.

19. A method in accordance with claim 18 wherein said superposed layers are drafted in at least two directions.

20. A method in accordance with claim 15 wherein step (c) immediately follows step (a) and immediately preceeds step (b), and step (d) immediately follows (b).

21. A method in accordance with claim 1 characterized further to include fusing at least a portion of said fibers of said nonwoven textile fabric layer subsequent to allowing said thus drafted superposed layers to relax.

22. A laminated article of manufacture comprising:
an inner layer of generally elastic material of inherent resilience having opposite sides, said generally elastic material being capable of being drafted in response to a drafting force from a first relaxed condition defined be a first set of dimensions to a second drafted condition defined be a second set of dimensions within the elastic limit of said generally elastic material, and further being capable of retracting from said second condition to substantially said first position in response to its inherent resilience upon release of said drafting force;
a first outer layer comprising a first generally inelastic nonwoven textile fabric comprising a plurality of generally coherent nonwoven fibers and superposed on one of the opposite sides of said inner layer of generally elastic material, said first outer layer being capable of being drafted in response to a drafting force from a first relaxed condition defined by a first set of dimensions to a second drafting condition defined by a second set of dimensions beyond the elastic limit of said first generally inelastic nonwoven texiile fabric, and further being incapable of self-induced retraction from said second condition to said first condition upon release of said drafting force; and
said layers being secured together at a plurality of locations spaced a distance one from the other by means of a plurality of said nonwoven fibers extending from said first outer layer through said inner layer of generally elastic material at at least one penetration point at each of said locations when said inner and outer layers are in their second conditions, whereby said first outer layer exhibits increased bulk intermediate said plurality of locations when said inner layer retracts from its second condition to substantially its first position.

23. A laminated article of manufacture in accordance with claim 22 wherein each of said locations comprises a plurality of said penetration points aligned in a row.

24. A laminated article of manufacture in accordance with claim 23 wherein said rows are generally mutually parallel.

25. A laminated article of manufacture in accordance with claim 22 characterized further to include a second outer layer of a second generally inelastic nonwoven textile fabric comprising a plurality of generally coherent nonwoven fibers and superposed on the opposite side of said layer of generally elastic material, said second outer layer being capable of being drafted in response to a drafting force from a first relaxed condition defined by a first set of dimensions to a second drafted condition defined by a second set of dimensions beyond the elastic limit of said second generally inelastic nonwoven textile fabric, and further being incapable of retracting from said second condition; and
said inner and outer layers being additionally secured together at said plurality of locations spaced a distance one from the other by means of said plurality of said nonwoven fibers of said first outer layer extending from said first outer layer through said inner layer and said outer layer at at least one penetration point at each of said locations when said inner layer and said first and second outer layers are in their second conditions, whereby said first and second outer layers both exhibit increased bulk intermediate said plurality of locations when said inner layer retracts from its second condition to substantially its first condition.

26. A laminated article of manufacture in accordance with claim 25 wherein each of said locations comprises a plurality of said penetration points aligned in a row.

27. A laminated article of manufacture in accordance with claim 24 wherein said rows are generally mutually parallel.

28. A laminated article of manufaciure in accordance with claim 22 wherein said inner layer comprises a sheet of elastic material selected from the group consisting of elastomers, natural rubbers and mixtures of any two or more thereof.

* * * * *